United States Patent [19]

Schroeder

[11] Patent Number: 5,162,718
[45] Date of Patent: Nov. 10, 1992

[54] STARTING DEVICE AND CIRCUIT FOR STARTING SINGLE PHASE MOTORS

[76] Inventor: Fritz H. Schroeder, P.O. Box 440098, Houston, Tex. 77244-0098

[21] Appl. No.: 401,223

[22] Filed: Aug. 31, 1989

[51] Int. Cl.$^5$ ............................................. H02P 1/44
[52] U.S. Cl. .................................. 318/794; 318/785; 318/795; 318/781
[58] Field of Search ............... 318/727, 728, 729, 778, 318/784-795, 810-811

[56] References Cited

U.S. PATENT DOCUMENTS

| | | | |
|---|---|---|---|
| 1,707,423 | 4/1929 | Bailey | 318/795 |
| 1,707,424 | 4/1929 | Bailey | 318/795 |
| 1,944,090 | 1/1934 | Lukens | 318/795 |
| 2,057,175 | 10/1936 | Werner | 318/795 |
| 2,057,214 | 10/1936 | Sleeter et al. | 318/795 |
| 2,181,734 | 11/1939 | Mooney | 318/795 |
| 2,280,971 | 4/1942 | Packer | 318/795 |
| 2,782,351 | 2/1957 | Suhr | 318/785 X |
| 3,020,464 | 2/1962 | Gerteis | 318/795 |
| 3,454,858 | 7/1969 | Robinson | 318/221 |
| 3,521,138 | 7/1970 | Enemark et al. | 318/221 |
| 3,538,409 | 11/1970 | Enemark | 318/220 |
| 4,012,678 | 3/1977 | Blaha | 318/794 |
| 4,063,135 | 12/1977 | Wanlass | 318/795 |
| 4,095,149 | 6/1978 | Wanlass | 318/795 X |
| 4,107,583 | 8/1978 | Houtman | 318/781 |
| 4,109,288 | 8/1978 | Berenson | 318/782 X |
| 4,451,775 | 5/1984 | Philips et al. | 318/795 X |
| 4,658,196 | 4/1987 | Hildebrandt | 318/793 |
| 4,734,601 | 3/1988 | Lewus | 318/795 X |
| 4,772,814 | 9/1988 | Lewus | 318/785 X |
| 4,853,569 | 8/1989 | Lewus | 318/795 X |

FOREIGN PATENT DOCUMENTS

| | | | |
|---|---|---|---|
| 0041479 | 4/1981 | Japan | 318/794 |
| 0022390 | 2/1982 | Japan | 318/794 |
| 0234479 | 11/1985 | Japan | 318/794 |

*Primary Examiner*—paul Ip
*Attorney, Agent, or Firm*—Kenneth A. Roddy

[57] ABSTRACT

An auxiliary capacitance starting device is connected by only two wires to a permanent split capacitor motor. The device includes an auxiliary capacitor and a potential relay which has a set of normally closed contacts and a relay coil. The auxiliary capacitor and the normally closed contacts are connected in series and the relay coil is connected in parallel therewith. The free ends of the two non-polarized wire leads are interchangeably electrically connected to the start and run windings or the run capacitor of the motor to place the circuit in parallel with the start and run windings or the run capacitor such that the relay coil means becomes energized upon detection of voltage representing full motor speed to open the contacts and break the electrical connection between the auxiliary capacitor and the start and run windings. The relay coil becomes de-energized upon detection of no voltage to close the contacts to allow the immediate re-application of electrical power to the common and run terminals of the motor. The components and circuitry are enclosed in a generally rectangular housing which may be mounted on a suitable surface in close proximity to the motor.

12 Claims, 1 Drawing Sheet

STARTING DEVICE AND CIRCUIT FOR STARTING SINGLE PHASE MOTORS

BACKGROUND OF THE INVENTION

1. Field of the Invention

This invention relates generally to apparatus and circuits for starting single phase motors, and more particularly to a starting device and circuit for starting single phase motors utilizing auxiliary capacitance provided by a pre-assembled universal add-on start kit connected across the start and run winding of an induction motor or in parallel with the run capacitor of a permanent split capacitor motor with only two interchangeable non-polarized wires.

2. Brief Description of the Prior Art

Single phases motors are commonly classified as split phase motors, permanent split capacitor motors, capacitor start-capacitor run motors and capacitor start-induction run motors. Most single phase induction motors require some type of switching arrangement for starting the motor, usually by switching start windings, a start capacitor, a run capacitor or a combination thereof until the motor reaches full speed. Capacitor start motors require a start capacitor only during the starting period of the motor. A permanent split capacitor motor has a run capacitor connected permanently across the run winding and start winding terminals of the motor.

It is often necessary to add auxiliary capacitance to the run capacitor used in conjunction with a permanent split capacitor motor (referred to as a PSC motor) during the starting phase of the motor so as to maintain the power factor as near to one as possible in order to achieve maximum power input and therefore apply maximum torque to the rotor of the PSC motor until the rotor reaches full speed. This starting phase usually lasts less then one second and the auxiliary capacitor must be disengaged from the circuit near or at the time the rotor reaches full speed.

Several auxiliary starting devices have been utilized to add auxiliary capacitance to the run capacitor of these type of motors. These auxiliary starting devices are commonly referred to as "Hard-Start Kit", "Start Assist" or "Motor Torque Multiplier". The two most common devices employed are:

One common auxiliary starting device utilizes an auxiliary capacitor in series with a solid state material which rapidly increases in resistance as it is heated when an electric current passes through it, thereby effectively disconnecting the auxiliary capacitor from the circuit soon after power is applied to the motor. However, one of the major problems with this method is that the solid state material remains hot from the "trickle current" that continues to pass through it as long as power is applied to the motor. Once the power has been disconnected from the motor, the solid state material begins to cool which requires approximately one to two minutes. If power is re-applied during the cooling off period, the auxiliary capacitor is ineffective because it is still de-energized.

Another auxiliary starting device utilizes an auxiliary capacitor electrically connected with two wires in parallel to the run capacitor through a normally closed set of contacts of an electromechanical relay commonly known as a potential relay. The coil of the relay is connected in parallel with the start winding of a permanent split capacitor (PSC) motor. As power is applied to the motor, the voltage across the start winding rises and when that voltage reaches a threshold near full speed of the rotor of the motor, the potential relay energizes, the normally closed contacts open and disconnect the auxiliary capacitor from the circuit. The potential relay remains energized until the power to the motor is disconnected. Once the power is disconnected, the circuit returns to the power-off state and the motor can be restarted immediately.

One of the major problems with this circuitry is that it requires three electrically conducting wires, one connected to the common terminal, one to the run terminal, and one to the start terminal of the motor. These wire connections are polarized, which means that each wire must be connected to a dedicated terminal and the wire connections can not be interchanged. Serious damage and injuries often occur because the wires have been connected incorrectly. This problem occurs so often that some air conditioning manufacturers have factory installed a plug for receiving auxiliary capacitance devices to prevent damage to their equipment caused by field service personnel incorrectly connecting the wires.

Another problem with this method is that the threshold voltages across the start windings vary greatly for different motor manufacturers and different motor sizes, and a variety of potential relays with different coil voltage energizing ratings must be used within a power voltage range (110 volts, 230 volts, etc). This means that a service man must always have available a very wide range of relay and capacitor combinations. For example, approximately ten different potential relays, each with a different coil voltage rating are available for 230 volt PSC motors alone. The above described auxiliary capacitance starting method requires field assembly and connecting the field assembled components to the dedicated terminals with three polarized wires. An arrangement which is time consuming, costly and subject to making wire connection errors.

There are also several patents which disclose various apparatus and methods of starting single phase motors.

Blaha, U.S. Pat. No. 4,012,678 discloses a wiring arrangement to minimize contact welding of a potential relay employed in a starting circuit. It does so by switching resistors and capacitors in series with the windings of an induction motor.

Robinson, U.S. Pat. No. 3,454,858 discloses a "hot-wire" thermal starting relay used in conjunction with a specially designed capacitor for fractional horse power motors.

Enemark et al, U.S. Pat. No. 3,521,138 discloses a thermally responsive bimetal starting mechanism for single phase motors. As pointed out above, thermally responsive devices, whether they are hot wire, bimetal, use a thermistor or ceramic material can not be restarted immediately once the power has been removed, because the aforementioned materials must cool to ambient temperatures before they become operative.

Enemark, U.S. Pat. No. 3,538,409 discloses a specially designed capacitor which when heated from current passing through it changes capacitance and therefore changes from a higher torque to a low torque starting system.

Hildebrandt, U.S. Pat. No. 4,658,196 discloses mechanical governor switches connected to the shaft of a motor which de-energizes and disconnects a start capacitor from the circuit when the motor shaft reaches full speed.

The present invention is distinguished over the prior art in general, and these patents in particular by an auxiliary capacitance starting device which is connected by only two wires to a permanent split capacitor motor. The device includes an auxiliary capacitor and a potential relay which has a set of normally closed contacts and a relay coil. The auxiliary capacitor and the normally closed contacts are connected in series and the relay coil is connected in parallel therewith. The free ends of the two non-polarized wire leads are interchangeably connected electrically to the start and run windings or the run capacitor of the motor to place the circuit in parallel with the start and run windings or the run capacitor such that the relay coil means becomes energized upon detection of voltage representing full motor speed to open the contacts and break the electrical connection between the auxiliary capacitor and the start and run windings. The relay coil becomes de-energized upon detection of no voltage to close the contacts to allow the immediate re-application of electrical power to the common and run terminals of the motor. The components and circuitry are enclosed in a generally rectangular housing which may be mounted on a suitable surface in close proximity to the motor.

SUMMARY OF THE INVENTION

It is therefore an object of the present invention to provide a starting device and circuit utilizing auxiliary capacitance for starting single phase induction motors requiring high torque starting loads which eliminates serious damage and injuries to equipment and personnel caused by incorrect wiring connections by field technicians.

It is another object of this invention to provide a starting device and circuit utilizing auxiliary capacitance which requires no field assembly, and is easily and safely installed by field technicians and reduces the time and cost of installation and the possibility of wire connection errors.

Another object of this invention to provide a pre-assembled, universal add-on auxiliary capacitance device and circuit which is easily, quickly, and safely connected across the start and run winding of an induction motor or in parallel with the run capacitor of a permanent split capacitor motor at the run capacitor.

Another object of this invention is to provide a pre-assembled, universal add-on auxiliary capacitance device which requires only two non-polarized wires for its connection.

Another object of this invention is to provide a single unit, universal add-on auxiliary capacitance apparatus device which eliminates the need to carry and choose from an assortment of ten or more combinations of components requiring field assembly and hazardous three wire polarized connections.

Another object of this invention is to provide a pre-assembled, universal add-on auxiliary capacitance device and circuit which does not require specially designed components and may be used on fractional and integral horse power motors.

A further object of this invention is to provide a pre-assembled, universal add-on auxiliary capacitance device and circuit which utilizes a potential relay and capacitor combination which may be used for a range of power voltages, does not require cooling, and allows immediate restart of the motor.

A still further object of this invention is to provide a unitary, universal add-on auxiliary capacitance device which is simple in construction, economical to manufacture, and rugged, and reliable in operation.

Other objects of the invention will become apparent from time to time throughout the specification and claims a hereinafter related.

The above noted objects and other objects of the invention are accomplished by an auxiliary capacitance starting device which is connected by only two wires to a permanent split capacitor motor. The device includes an auxiliary capacitor and a potential relay which has a set of normally closed contacts and a relay coil. The auxiliary capacitor and the normally closed contacts are connected in series and the relay coil is connected in parallel therewith. The free ends of the two non-polarized wire leads are interchangeably electrically connected to the start and run windings or the run capacitor of the motor to place the circuit in parallel with the start and run windings or the run capacitor such that the relay coil means becomes energized upon detection of voltage representing full motor speed to open the contacts and break the electrical connection between the auxiliary capacitor and the start and run windings. The relay coil becomes de-energized upon detection of no voltage to close the contacts to allow the immediate re-application of electrical power to the common and run terminals of the motor. The components and circuitry are enclosed in a generally rectangular housing which may be mounted on a suitable surface in close proximity to the motor.

DESCRIPTION OF THE PREFERRED EMBODIMENT

Figure 1:
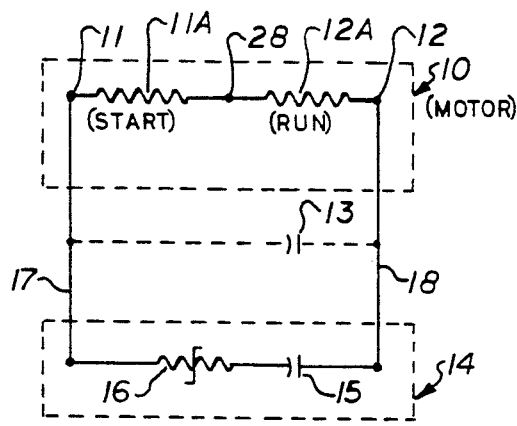
FIG. 1 is a schematic electrical diagram of a prior art auxiliary capacitance circuit for starting motors utilizing a capacitor and a solid state material.

Referring to the drawings by numerals of reference, the present invention is best explained by a comparison with the prior art.

One common prior art method of providing auxiliary capacitance to single phase induction motors is shown in FIG. 1. The motor 10 represented in dotted line has a start terminal 11, a run terminal 12, and a common terminal 28. In the case of permanent split capacitor motors, a run capacitor 13 is connected permanently across the start and run terminals 11 and 12 of the motor. The prior art auxiliary starting apparatus 14 represented in dotted line comprises an auxiliary capacitor 15 connected in series with a solid state material 16. The auxiliary apparatus 14 is connected with two electrically conducting wires 17 and 18 to the start terminal 11 and run terminal 12 of the motor 10, or in parallel with the run capacitor 13 of a permanent split capacitor motor.

The solid state material 16 rapidly increases in resistance as it is heated when an electric current passes through it, and effectively disconnects the auxiliary capacitor 15 from the circuit soon after power is applied to the start and run terminals 11 and 12 of motor 10. The solid state material 16 remains hot from the "trickle current" that continues to pass through it as long as power is applied to motor 10. Once the power has been disconnected from motor 10, the solid state material 16 begins to cool which requires approximately one to two minutes. If power is re-applied during the cooling off period, the auxiliary capacitor 15 is ineffective because it is still de-energized.

Figure 2:
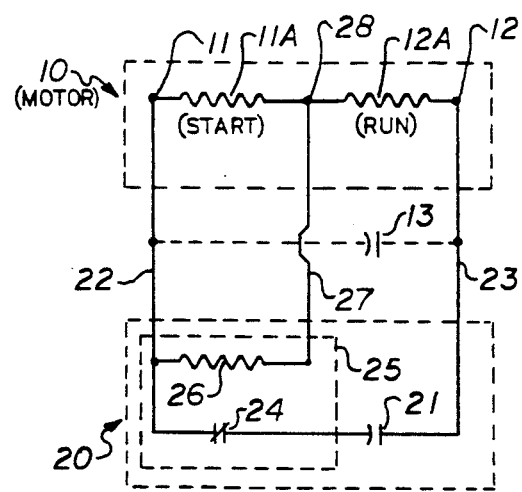
FIG. 2 is a schematic electrical diagram of another prior art auxiliary capacitance circuit for starting motors utilizing an electromechanical relay and requiring a three wire polarized connection for its installation.

Another common prior art method of providing auxiliary capacitance to single phase motors is shown in FIG. 2. As previously described, the motor 10 represented in dotted line has a start terminal 11, a run terminal 12, and a common terminal 28. In the case of permanent split capacitor motors, a run capacitor 13 is connected permanently across the start and run terminals 11 and 12 of the motor. The auxiliary starting apparatus 20 represented in dotted line comprises an auxiliary capacitor 21 connected by wires 22 and 23 in parallel to the run capacitor 13 through a normally closed set of contacts 24 of an electromechanical relay 25 commonly known as a potential relay. The coil 26 of relay 25 is electrically connected with wires 22 and 27 in parallel with the start winding 11A of a permanent split capacitor motor 10.

As power is applied to the motor 10 at common terminal 28 and run terminal 12, the voltage across the start winding 11A rises and when that voltage reaches a threshold near full speed of the rotor of the motor 10, potential relay 25 energizes and contacts 24 open to disconnect the auxiliary capacitor 21 from the circuit. The potential relay 25 remains energized until the power to the motor 10 is disconnected. Once the power is disconnected, the circuit returns to the power-off state and the motor can be restarted immediately. The apparatus of FIG. 2 requires three electrically conducting wires, 27, 22 and 23 connected to the common 28, start 11 and run 12 terminals, respectively, of the motor 10. These wire connections are polarized, that is each wire must be connected to a dedicated terminal and the wire connections can not be interchanged. The threshold voltages across start winding 11A varies greatly for different motor manufacturers and different motor sizes. A variety of potential relays with different coil voltage energizing ratings must be used within a power voltage range, that is 110 Volts, 230 volts etc. Approximately ten different potential relays, each with a different coil voltage rating are available for 230 volt PSC motors alone.

The three wire connection of FIG. 2 often results in serious damage and injuries due to the wires being connected incorrectly. Also, since the threshold voltages across start winding 11A varies greatly for different motor manufacturers and different motor sizes, field service personnel must carry an inventory of a very wide range of relay and capacitor combinations, and spend a large portion of their service time completing the component matching and wiring operations.

Figure 3:
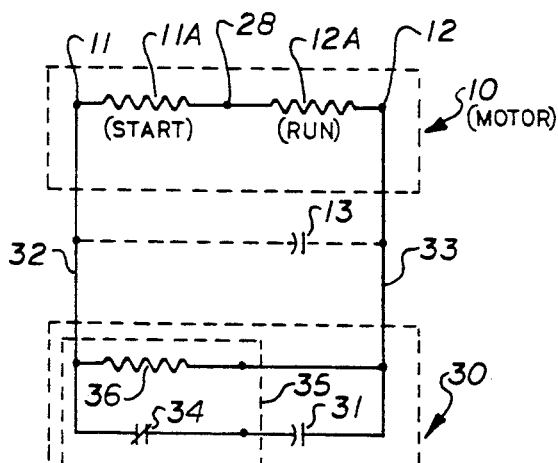
FIG. 3 is a schematic electrical diagram of the auxiliary capacitance circuit for starting motors in accordance with the present invention utilizing potential relay and requiring only a two wire non-polarized connection for its installation.

Referring now to FIG. 3 of the drawings, the auxiliary start method of the present invention is illustrated. As described above with reference to FIG. 2, the motor 10 represented in dotted line has a start terminal a run terminal 12, and common terminal 28. In the case of permanent split capacitor motors, a run capacitor 13 is connected permanently across the start and run terminals 11 and 12 of the motor. The present auxiliary starting apparatus 30 represented in dotted line comprises an auxiliary capacitor 31 connected, at the power off state, by wires 32 and 33 in parallel to the run capacitor 13 through a normally closed set of contacts 34 of a potential relay 35. The coil 36 of the potential relay 35 is parallel connected to the wires 32 and 33. The wires 32 and 33 are not dedicated and may be interchangeably connected to the start and run terminals or to the run capacitor.

As power is applied to the run winding 12A of motor 10 at common terminal 28 and run terminal 12, the voltage begins to rise between start winding terminal 11 and run winding terminal 12. This voltage is sensed across coil 36 of potential relay 35. When this voltage reaches the threshold near or at full speed of the rotor of motor 10, potential relay 35 energizes and contacts 34 open to disconnect auxiliary capacitor 31 from the circuit. When the power is disconnected from motor 10, the circuit returns immediately to the power-off state and can be recycled instantly.

Figure 4:
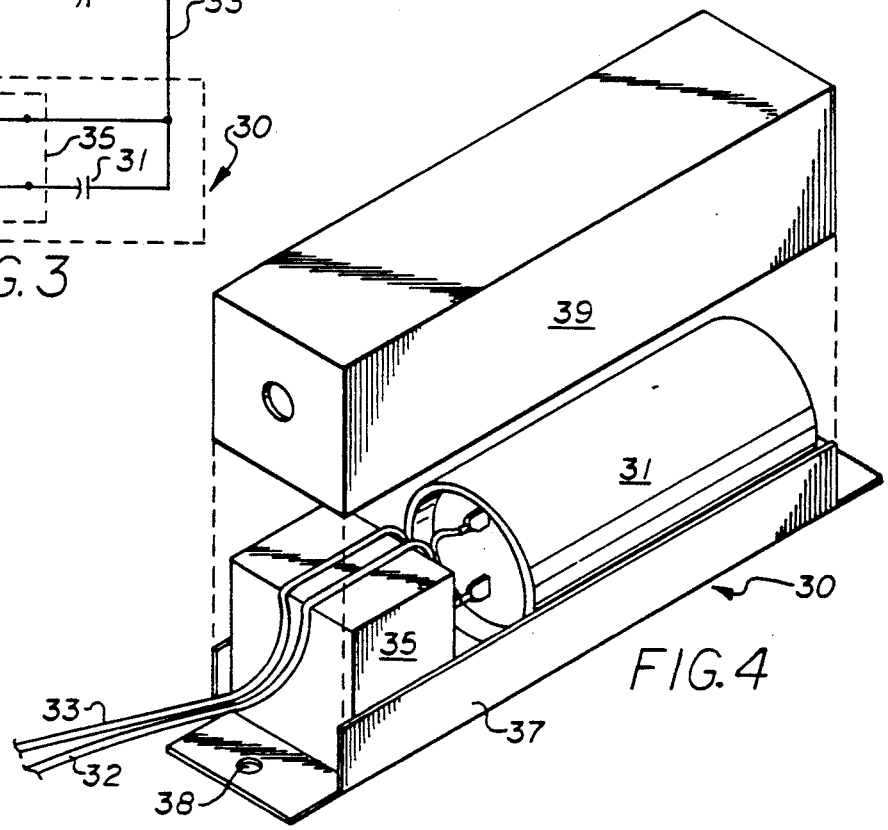
FIG. 4 is an isometric view of the auxiliary capacitance apparatus in accordance with the present invention.

As shown in FIG. 4, the auxiliary capacitor 31 and potential relay 35 components of the auxiliary starting apparatus 30 are pre-wired and mounted within a rectangular base member 37. The components are connected such that the auxiliary capacitor 31 and the contacts 34 of relay 35 are connected in series, and the coil 36 of relay 35 is connected in parallel with wire leads 32 and 33 extending outwardly from the relay connections. The base member 37 has a mounting hole 38 in at least one end to receive a sheet metal screw for mounting the base to a suitable surface adjacent the run capacitor of the motor. A box-like cover 39 is secured over the base member 37 to enclose the components with only the two wires 32 and 33 extending outwardly therefrom. The cover and base are secured together by conventional means, such as a snap fit, soldering, or epoxy. It should be understood, that the components, after being wired together may be alternatively encased in a potting material to form a unitary starting module with only two wires extending outwardly therefrom Thus present auxiliary starting apparatus may be easily mounted, such as on the frame or housing of an air conditioning or refrigeration compressor unit, and the two non-polarized wires quickly and safely connected to the start and run terminals of the motor, or in parallel with the run capacitor of a permanent split capacitor motor. The wire connections are not dedicated and may be interchanged. Since the threshold voltage developed across the run and start terminals of these motors is relatively unvarying for different motor manufacturers and motor sizes, one potential relay may be used for a particular power voltage range. The present invention eliminates having to choose from an assortment of combinations of components and the costly, time consuming field assembly and hazardous task of connecting the components with three polarized wires.

While this invention has been described fully and completely with special emphasis upon a preferred embodiment, it should be understood that within the scope of the appended claims the invention may be practiced otherwise than as specifically described herein.

I claim:

1. An auxiliary starting circuit adapted to be connected by only two interchangeable wires to a permanent split capacitor motor having a start winding and a run winding, the auxiliary starting circuit comprising;

an auxiliary start capacitor and normally closed contacts electrically connected in series, said auxiliary start capacitor and said normally closed contacts adapted to be placed electrically in parallel with the existing start and run windings when the motor is started, a potential relay coil electrically connected in parallel with said auxiliary start capacitor and said normally closed contacts for sensing a voltage rise in the start and run windings of the motor, whereby said potential relay coil becomes energized upon detection of voltage representing full motor speed to open said normally closed contacts and disconnect the electrical connection between said auxiliary start capacitor and the start and run windings of the motor, and said potential relay coil becomes de-energized upon detection of no voltage to close said normally closed contacts and reconnect said auxiliary start capacitor to allow the immediate re-application of electrical power to the common and run terminals of the motor for starting the motor through the auxiliary start circuit.

2. The auxiliary starting circuit according to claim 1 wherein said auxiliary start capacitor, said normally closed contacts, and said relay coil are adapted to be electrically connected in parallel between the start terminal and run terminal of the motor.

3. The auxiliary starting circuit according to claim 1 wherein said permanent split capacitor motor includes a run capacitor electrically connected in parallel with the start and run windings of the motor, and said auxiliary start capacitor, said normally closed contacts, and said relay coil are adapted to be electrically connected in parallel with the run capacitor of the motor.

4. The auxiliary starting circuit according to claim 1 wherein said normally closed contacts and said relay coil are housed within a single relay member.

5. A method for starting a permanent split capacitor motor having a start winding and a run winding through an auxiliary starting circuit comprising the steps of;

electrically connecting an auxiliary start capacitor and the normally closed contacts of a potential relay in series, electrically connecting the coil of said potential relay in parallel with said series connected auxiliary start capacitor and normally closed contacts for sensing voltage.

electrically connecting the series connected auxiliary start capacitor and normally closed contacts and the potential relay coil connected in parallel therewith in parallel with the start and run windings of the motor, and applying electrical power to the common and run terminals of the motor, whereby said potential relay coil means becomes energized upon detection of voltage representing full motor speed to open said normally closed contacts and disconnect the electrical connection between said auxiliary start capacitor and the start and run windings, and said potential relay coil becomes de-energized upon detection of no voltage to close said normally closed contacts and reconnect said auxiliary start capacitor to allow the immediate re-application of electrical power to the common and run terminals of the motor for starting the motor through the auxiliary start circuit.

6. The starting method according to claim 5 wherein said step of electrically connecting said series connected auxiliary start capacitor and normally closed relay contacts and said potential relay coil in parallel to the start and run windings of the motor comprises connecting either wire extending from the coil and contact terminal of the relay to the start terminal of the motor and the other wire extending from the auxiliary start capacitor and coil terminal to the run terminal of the motor.

7. The starting method according to claim 5 wherein said permanent split capacitor motor includes a run capacitor electrically connected in parallel with the start and run windings of the motor, and said step of electrically connecting said series connected auxiliary start capacitor and normally closed relay contacts and said potential relay coil in parallel to the start and run windings of the motor comprises connecting either wire extending from the coil and contact terminal of the relay to one terminal of the run capacitor of the motor and the other wire extending from the auxiliary capacitor and coil terminal to another terminal of the run capacitor of the motor.

8. An auxiliary starting device adapted to be connected by only two interchangeable wires to a permanent split capacitor motor having a start winding and a run winding, the device comprising;

an auxiliary start capacitor and potential relay means including a set of normally closed contacts and a potential relay coil, said auxiliary start capacitor and said normally closed contacts electrically connected to one another in series and said potential relay coil electrically connected in parallel with said series connected auxiliary start capacitor and said normally closed contacts, one element of said normally closed contacts being connected to a first terminal, said auxiliary start capacitor being connected in series between another element of said normally closed contacts and a second terminal, and said potential relay coil being connected between said first terminal and said second terminal and coupled with said normally closed contacts to open said contacts upon a predetermined voltage representing full motor speed, a first non-polarized wire lead having one end connected to said first terminal and a second non-polarized wire lead having one end connected to said second terminal, and the free ends of said non-polarized wire leads adapted to be interchangeably electrically connected in parallel with the start and run windings of the motor, whereby said potential relay coil becomes energized upon detection of voltage representing full motor speed to open said normally closed contacts and disconnect the electrical connection between said auxiliary start capacitor and the start and run windings, and said potential relay coil becomes de-energized upon detection of no voltage to close said normally closed contacts and reconnect said auxiliary start capacitor to allow the immediate re-application of electrical power to the common and start terminals of the motor for starting the motor through the auxiliary start circuit.

9. The auxiliary starting device according to claim 8 wherein the free ends of said first and second wire leads are adapted to be interchangeably electrically connected in parallel to the start terminal and run terminal of the motor.

10. The auxiliary starting device according to claim 8 wherein said permanent split capacitor motor includes a run capacitor electrically connected in parallel with the start and run windings of the motor, and the free ends of said first and second wire leads are adapted to be interchangeably electrically connected in parallel with the run capacitor of the motor.

11. The auxiliary starting device according to claim 8 wherein said auxiliary start capacitor and said potential relay are interconnected such that said auxiliary start capacitor and said normally closed relay contacts are connected in series and said potential relay coil is connected in parallel therewith, and said interconnected auxiliary start capacitor and potential relay are mounted within a generally rectangular housing with said first and second wire leads extending outwardly therefrom.

12. The auxiliary starting device according to claim 11 wherein said generally rectangular housing is provided with mounting means for mounting said housing to a suitable surface in close proximity to the motor.

* * * * *